(12) United States Patent
Matsunaga et al.

(10) Patent No.: US 11,968,544 B2
(45) Date of Patent: Apr. 23, 2024

(54) CONTROL DEVICE, CONTROL METHOD, AND COMPUTER- READABLE STORAGE MEDIUM

(71) Applicant: HONDA MOTOR CO., LTD., Tokyo (JP)

(72) Inventors: Hideki Matsunaga, Wako (JP); Masamitsu Tsuchiya, Wako (JP); Toshiaki Takano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 17/483,729

(22) Filed: Sep. 23, 2021

(65) Prior Publication Data
US 2022/0014934 A1   Jan. 13, 2022

Related U.S. Application Data

(63) Continuation of application No. PCT/JP2019/014300, filed on Mar. 29, 2019.

(51) Int. Cl.
  *H04W 16/26* (2009.01)
  *H04W 24/02* (2009.01)
  *H04W 88/08* (2009.01)

(52) U.S. Cl.
  CPC ......... *H04W 16/26* (2013.01); *H04W 24/02* (2013.01); *H04W 88/08* (2013.01)

(58) Field of Classification Search
  CPC ...... H04W 16/26; H04W 24/02; H04W 88/08
  See application file for complete search history.

(56) References Cited

U.S. PATENT DOCUMENTS

| 2016/0028471 | A1* | 1/2016 | Boss ................ H04W 28/0289 |
| | | | 455/406 |
| 2016/0363457 | A1 | 12/2016 | Jelavic et al. |
| 2017/0295609 | A1* | 10/2017 | Darrow ............. H04B 7/18504 |

FOREIGN PATENT DOCUMENTS

| CN | 103051373 A | 4/2013 |
| CN | 105554840 A | 5/2016 |
| CN | 106717048 A | 5/2017 |
| JP | 2017-216663 A | 12/2017 |
| JP | 2018-157249 A | 10/2018 |

(Continued)

OTHER PUBLICATIONS

International Search Report and Written Opinion for PCT/JP2019/014300 dated May 28, 2019.

(Continued)

*Primary Examiner* — Wayne H Cai
(74) *Attorney, Agent, or Firm* — Thomas| Horstemeyer, LLP

(57) ABSTRACT

A control device acquires quality information indicating a correspondence relationship between a position and communication quality related to wireless communication at the position, and route information indicating a movement route of a mobile base station, specifies an area in which the communication quality is determined to be lower than a predetermined communication quality based on the quality information, and executes control for moving the mobile base station to a position at which a wireless communication service can be provided in at least a part of the area in a case where the position is included in the movement route based on the route information.

10 Claims, 3 Drawing Sheets

(56) References Cited

FOREIGN PATENT DOCUMENTS

| | | |
|---|---|---|
| JP | 2018-195928 A | 12/2018 |
| JP | 2019-033409 A | 2/2019 |
| WO | 2018/211828 A1 | 11/2018 |
| WO | 2020/202371 A1 | 10/2020 |

OTHER PUBLICATIONS

Chinese Office Action for Chinese Patent Application No. 201980094072.8 dated Apr. 25, 2023.

* cited by examiner

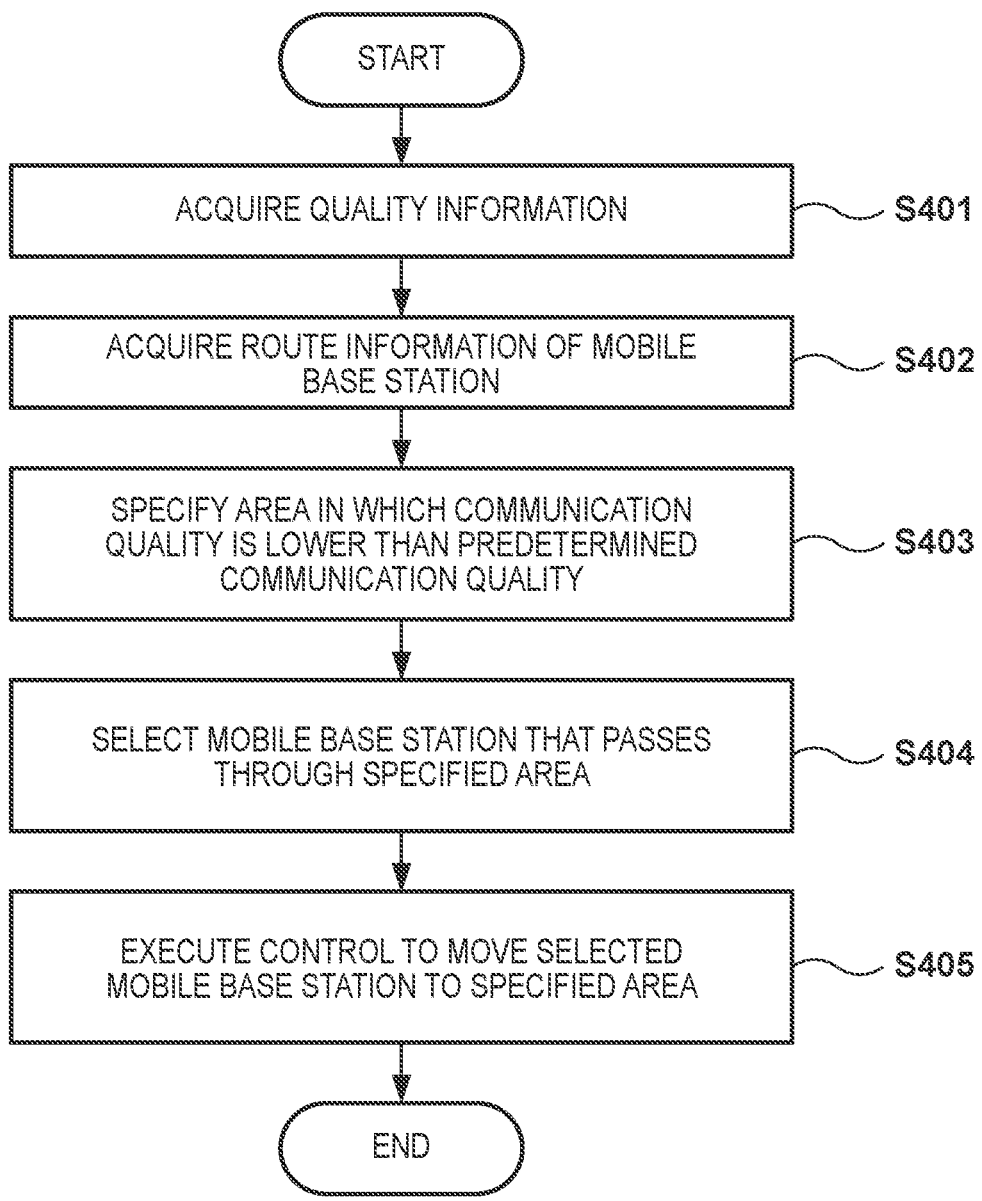

CONTROL DEVICE, CONTROL METHOD, AND COMPUTER-READABLE STORAGE MEDIUM

CROSS-REFERENCE TO RELATED APPLICATION(S)

This application is a continuation of International Patent Application No. PCT/JP2019/014300 filed on Mar. 29, 2019, the entire disclosures of which is incorporated herein by reference.

BACKGROUND OF THE INVENTION

Field of the Invention

The present invention relates to a communication quality improvement technology of wireless communication.

Description of the Related Art

A remote driving technology in which a vehicle is operated and moved by an operator existing at a remote place is known. In remote driving, sufficiently suppressing a communication delay between an operator device operated by an operator who executes the remote driving and a terminal device mounted on a vehicle is one of required communication qualities (see Patent Literature 1).

CITATION LIST

Patent Literature

PTL1: Japanese Patent Laid-Open No. 2017-216663

For control using wireless communication such as remote driving and automated driving, it is important to provide a stable wireless communication service. In order to provide such a stable wireless communication service, a communication quality improvement technology in an area where communication quality is insufficient is required.

SUMMARY OF THE INVENTION

The present invention provides a communication quality improvement technology in an area where communication quality is insufficient.

A control device according to an aspect of the present invention includes: an acquiring unit configured to acquire quality information indicating a correspondence relationship between a position and communication quality related to wireless communication at the position, and route information indicating a movement route of a mobile base station; a specifying unit configured to specify an area in which the communication quality is determined to be lower than a predetermined communication quality based on the quality information; and a controlling unit configured to execute control for moving the mobile base station to a position at which wireless communication can be provided in at least a part of the area in a case where the position is included in the movement route based on the route information.

Further features of the present invention will become apparent from the following description of exemplary embodiments (with reference to the attached drawings).

BRIEF DESCRIPTION OF THE DRAWINGS

FIG. 4 is a diagram illustrating an example of a flow of processing executed by a control device.

DESCRIPTION OF THE EMBODIMENTS

Figure 1:
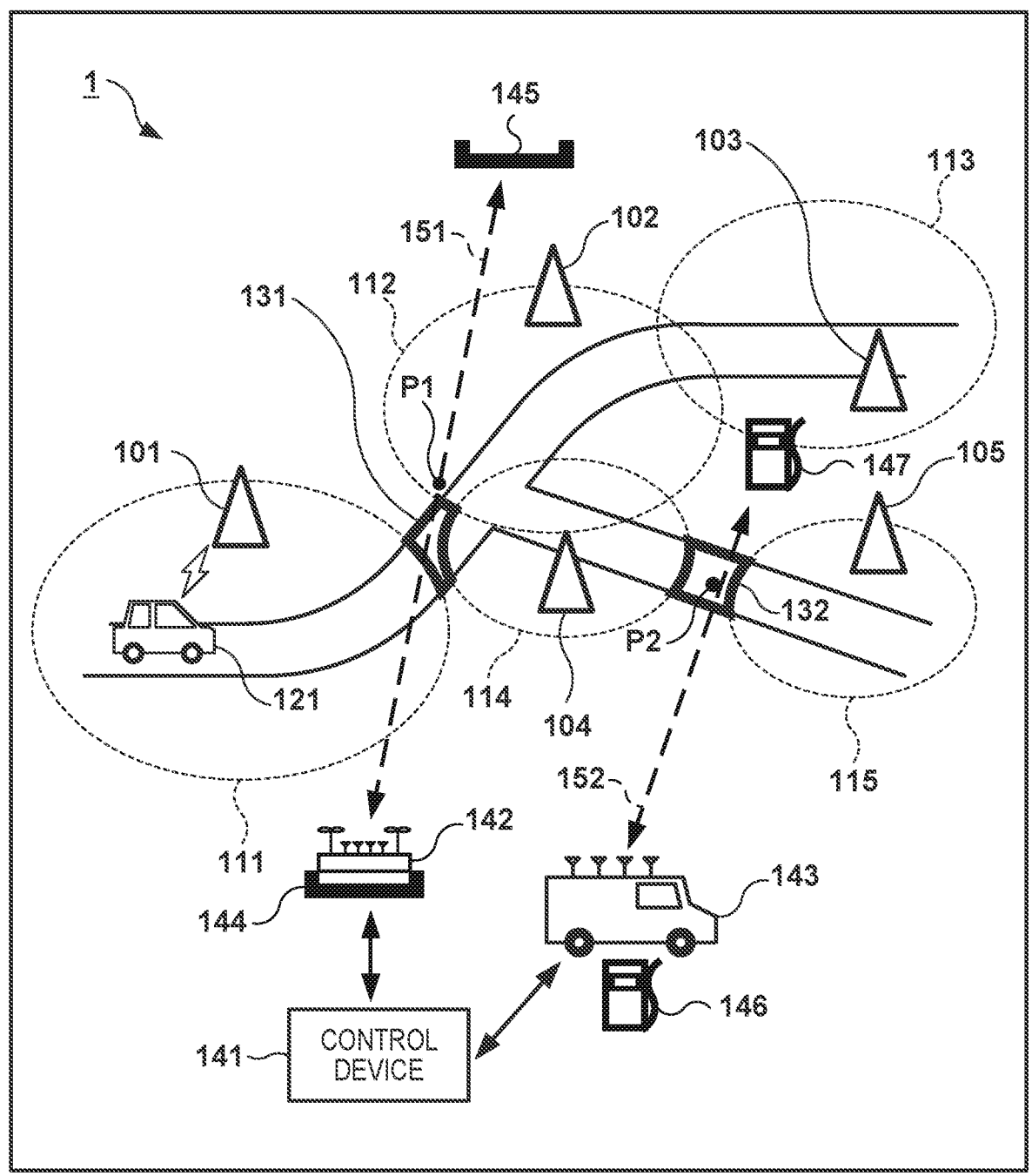
FIG. 1 is a diagram illustrating a system configuration example.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 illustrates a configuration example of a control system 1 according to the present embodiment. The control system 1 can be a system used to improve communication quality in a wireless communication system in which a planar communicable area is deployed such as cellular wireless communication. Note that FIG. 1 illustrates an example on the premise of a cellular communication system, but a wireless LAN or another wireless communication system may be used. Note that the communication quality to be improved here can be represented by indices such as signal-to-noise power ratio (SNR), signal-to-interference-plus-noise power ratio (SINR), reference signal received power (RSRP), reference signal received quality (RSRQ), and received signal strength. The communication quality is evaluated to have been improved when the value becomes large. Furthermore, the communication quality may be, for example, a communication delay between the terminal device and a communication partner device connected via a base station or a network, and in this case, the communication quality can be evaluated to have been improved when the communication delay is shortened. Furthermore, the communication quality may be the congestion degree of a base station, the use rate of radio resources, or the like, and in this case, the communication quality is evaluated to have been improved when the congestion is eliminated or the use rate of radio resources is reduced. Furthermore, communication quality other than these may be a target of improvement.

The cellular communication system is configured such that each of a plurality of base stations (for example, a base station 101, a base station 102, a base station 103, a base station 104, and a base station 105) provides a wireless communication service to a terminal device with a range of a cell (for example, a cell 111, a cell 112, a cell 113, a cell 114, and a cell 115) formed by the base station itself as a communicable range. The terminal device may be, for example, an in-vehicle terminal device 121 mounted on a remote driving vehicle or an automated driving vehicle, but is not limited thereto. For example, a portable terminal device such as a smartphone, a tablet, or a notebook PC, a fixed terminal device, or the like can operate as a terminal device in the cellular communication system.

In a cellular communication system, a large number of base stations are arranged, and a cell formed by each of the base stations is arranged such that a part thereof overlaps with another cell, thereby providing a planar seamless wireless communication service. However, even if a cell arrangement plan in which all regions belong to any cell is applied, there may be a region (for example, a region 131 and a region 132) in which the communication quality is insufficient in an actual communication environment. For example, such a situation can occur in a case where radio waves attenuate more than expected due to an influence of a building and a part of the region cannot be covered. Furthermore, in a case where a large number of terminal devices exist in a concentrated manner in a relatively narrow region, available communication resources (for example, frequency/time resources, spatial resources, or operation resources) are insufficient in the region, and deterioration of communication quality such as an increase in communication delay can occur.

In the present embodiment, mobile base stations (for example, a mobile base station 142 of an automatic flight vehicle type and a mobile base station 143 of a vehicle type) are used to provide wireless communication with sufficient communication quality in such a region where the communication quality is not sufficient (for example, the region 131 and the region 132). That is, in a case where there is a region where communication quality is not sufficient, the mobile base station is moved to a position at which wireless communication can be provided in the region. This enables a high-quality wireless communication service to be provided to the terminal device in the region where sufficient communication quality cannot be obtained with a fixed base station.

On the other hand, the mobile base station needs fuel for moving to a position at which a wireless communication service can be provided and a power source for providing a wireless communication service at the position. Therefore, for example, the mobile base station can be operated to stay at a base for charging or refueling while it is not necessary to provide a wireless communication service. In the present embodiment, in consideration of such an operation, it is assumed that the mobile base station moves so as to depart from the base and arrive at the base after movement. For example, the mobile base station 142 moves between a base 144 and a base 145 for charging. Furthermore, the mobile base station 143 moves between a base 146 and a base 147 for refueling/charging. Note that, although FIG. 1 illustrates an example in which the mobile base station moves between two bases as an example, the mobile base station may not move between two bases as long as the mobile base station moves on a predetermined route after departing from any base and returns to any base. For example, after departing from the base 144, the mobile base station 142 may move according to a predetermined movement route and return to the base 144. Similarly, after departing from the base 146, the mobile base station 143 may also move along a predetermined movement route and return to the base 146. Furthermore, a movement route for sequential movement between three bases may be used. Note that the base does not necessarily need to be capable of charging or refueling, and may be, for example, a garage or a maintenance base without a charging/refueling function.

In the present embodiment, there is provided a control technology for causing a mobile base station to provide a wireless communication service in an area where communication quality is insufficient when the mobile base station moves on a predetermined movement route in this manner. The control system of FIG. 1 includes a control device 141 for executing such control. In a case where a position at which a wireless communication service can be provided in a region where communication quality is insufficient is included on the movement route of each mobile base station, the control device 141 executes control to move and stay the mobile base station at the position to provide the wireless communication service. For example, a movement route 151 of the mobile base station 142 passes through the region 131. Therefore, the control device 141 executes the control for causing the mobile base station 142 to stay at a position on the movement route 151 where the wireless communication service can be provided in the region 131, and causes the mobile base station 142 to provide the wireless communication service at the position. Similarly, a movement route 152 of the mobile base station 143 passes through the region 132. Therefore, the control device 141 executes the control for causing the mobile base station 142 to stay at a position on the movement route 151 where the wireless communication service can be provided in the region 132, and causes the mobile base station 142 to provide the wireless communication service at the position. Note that the mobile base station returns to any base after ending the provision of the wireless communication service, and can efficiently return to the base because the mobile base station provides the wireless communication service without deviating from the movement route.

In order to execute the control as described above, the control device 141 acquires quality information indicating a correspondence relationship between the position of the communication device and the communication quality of the wireless communication at the position, and specifies an area in which the communication quality is determined to be lower than the predetermined communication quality on the basis of the quality information. Then, on the basis of the route information indicating the movement route of the mobile base station, the control device 141 determines whether the position at which the wireless communication service can be provided in at least a part of the area in which the communication quality is determined to be lower than the predetermined communication quality is included in the movement route. Note that the "movement route" here also includes a range separated a predetermined distance from the movement route. That is, it is determined whether or not the position at which the wireless communication service can be provided in at least a part of the area where communication quality is insufficient is included within the range of the predetermined distance from the movement route. Then, in a case where it is determined that the mobile base station can provide the wireless communication service to at least a part of the area where communication quality is insufficient at the position included in the movement route, the control device 141 executes the control for moving the mobile base station to the position. Note that the position at which the wireless communication service can be provided in a certain area may be a position outside the area. For example, in a case where the position at which the mobile base station can stay does not exist in the area, the control device 141 moves the mobile base station to a position outside the area where the wireless communication service can be provided. In the example of FIG. 1, in a case where the mobile base station 142 can provide the wireless communication service in the region 131, for example, at a position P1, the control device 141 executes the control for moving the mobile base station 142 to the position P1. For example, the control device 141 can transmit, to the mobile base station 142, an instruction signal that designates the position P1 and instructs movement. According to this, it is possible to efficiently improve the communication quality of an area where communication quality is insufficient by using the mobile base station that moves along the movement route set in advance. Note that the instruction signal is transmitted, for example, to the mobile base station 142 moving along the movement route 151 via any base station by cellular communication. Furthermore, the instruction signal may be transmitted using, for example, a wireless communication network dedicated to controlling. Note that since the movement route 151 of the mobile base station 142 is determined in advance, for example, it is easy to arrange a dedicated control radio station fixed around the movement route 151.

Note that, in a case where the movement route of a certain mobile base station does not include a position at which the wireless communication service can be provided in at least a part of an area where communication quality is insufficient, the control device 141 does not move the mobile base station for improving the communication quality in the area, but executes the control for moving another mobile base station for improving the communication quality in the area. For example, the control device 141 determines regarding the region 132 that the mobile base station 142 cannot provide the wireless communication service at any position on the movement route 151, and does not perform the control for directing the mobile base station 142 to the region 132. On the other hand, the control device 141 can determine that the mobile base station 143 can improve the communication quality of the region 132 at a position P2 within the range of the predetermined distance from the movement route. In this case, the control device 141 executes the control for directing the mobile base station 143 to the position P2. In this manner, the control device 141 can efficiently determine which mobile base station is to be moved for providing the wireless communication service in an area where communication quality is insufficient on the basis of the information of the movement route of each of the plurality of mobile base stations and the information of the communication quality for each position.

Note that the control device 141 collects, for example, information of a position at which the wireless communication device has executed communication in the past and the communication quality at the position as the information indicating the correspondence relationship between the position of the communication device and the communication quality at the position. Then, the control device 141 acquires, as the quality information, values such as an average value, a variance, a maximum value, a minimum value, and a distribution of values indicating the communication quality at each of a large number of positions obtained as a result of collecting a large number of pieces of information. Based on the communication quality in such past communication, the control device 141 determines an area in which the communication quality is predicted to be lower than the predetermined communication quality at the current time as an area in which the communication quality is lower than the predetermined communication quality. Furthermore, the control device 141 may acquire information of communication quality in communication executed during a predetermined period including the current time (hereinafter, this period may be referred to as "present"). Then, the control device 141 can determine an area in which the communication quality at present is lower than the predetermined communication quality as an area in which the communication quality is lower than the predetermined communication quality.

Furthermore, as an example of the control for moving the mobile base station, the control device 141 can execute the control for outputting information indicating a position to which the mobile base station is to be moved and providing the information to a network operator or the like that operates the mobile base station. Furthermore, the control device 141 can execute the control for setting a position to which the mobile base station is to be moved inside the mobile base station as a destination. The mobile base station can be an automatic flight vehicle capable of automatic movement such as a drone, an automated driving vehicle, or a remote driving vehicle. In this case, by executing the control for setting a destination in the mobile base station, the mobile base station can automatically move to a position at which the wireless communication service can be provided in a region where communication quality is insufficient. Note that the destination can be determined according to the characteristics of the mobile base station. That is, when the mobile base station is a vehicle having a base station function such as an automated driving vehicle, it is necessary to designate a road or a position available for parking as a destination. In the present embodiment, when the mobile base station is a vehicle, the movement route is a road. However, it does not indicate that the mobile base station may stay at any position on the road to operate as a base station. For this reason, even if the position at which the mobile base station can provide the wireless communication service is on the movement route, it is determined whether the mobile base station is allowed to stay on the road, and in a case where the mobile base station cannot stay on the road, a nearby available parking lot or the like needs to be designated as the destination. Furthermore, in a case where the wireless communication service is to be provided at a position within a range of a predetermined distance from the movement route, it is necessary to designate a road, a parking lot, or the like in the vicinity of the position at which the mobile base station can stay as the destination. Furthermore, in a case where the mobile base station is a flight vehicle having a base station function such as an automatic flight vehicle, it is not necessary to pay attention to a road or a position available for parking, but it is necessary to designate the latitude, longitude, and height to stay in the air in consideration of the height of a building or the like. In particular, when the mobile base station is on a movement route, the mobile base station should be able to move on the movement route. However, in a case where the mobile base station is to move to a position away from the movement route within a range of a predetermined distance, it is necessary to consider the influence of surrounding buildings and the like in the designation of the position. Therefore, the control device 141 determines and sets a destination suitable for the characteristics of the mobile base station.

Hereinafter, the configuration and operation of the control device that executes such processing will be described.

(Device Configuration)

Figure 2:
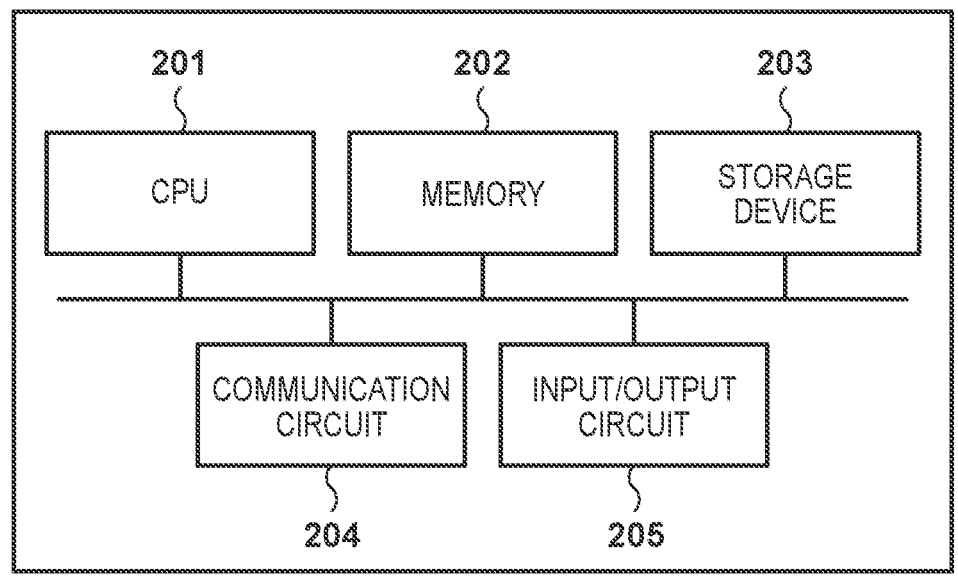
FIG. 2 is a diagram illustrating a hardware configuration example of a control device.

FIG. 2 illustrates a hardware configuration example of the control device 141 of the present embodiment. The control device 141 is a general-purpose computer in one example, and includes, for example, a CPU 201, a memory 202, a storage device 203, a communication circuit 204, and an input/output circuit 205. The CPU 201 executes, for example, a program stored in the memory 202 to execute processing to be described later and control of the entire device. Note that the CPU 201 can be substituted by any one or more processors such as an MPU and an ASIC. The memory 202 holds a program for causing the control device 141 to execute various processing and functions as a work memory at the time of executing the program. In one example, the memory 202 is random access memory (RAM) or read-only memory (ROM). The storage device 203 is, for example, a detachable external storage device, a built-in hard disk drive, or the like, and holds various types of information. The communication circuit 204 executes signal processing related to communication, acquires various types of information from an external device through a communication network, and transmits the various types of information to the external device. Note that the information acquired by the communication circuit 204 can be stored in, for example, the memory 202 or the storage device 203. Note that the control device 141 can include a plurality of communication circuits 204. The input/output circuit 205 controls, for example, output of screen information to be displayed on a display device, which is not illustrated, or audio information to be output from a speaker, and reception of user input via a keyboard, a pointing device, or the like. Note that the input/output circuit 205 may control a device that integrally performs input/output such as a touch panel. Note that the configuration of FIG. 2 is an example, and for example, the control device 141 may be configured by dedicated hardware for executing the above-described processing.

Figure 3:
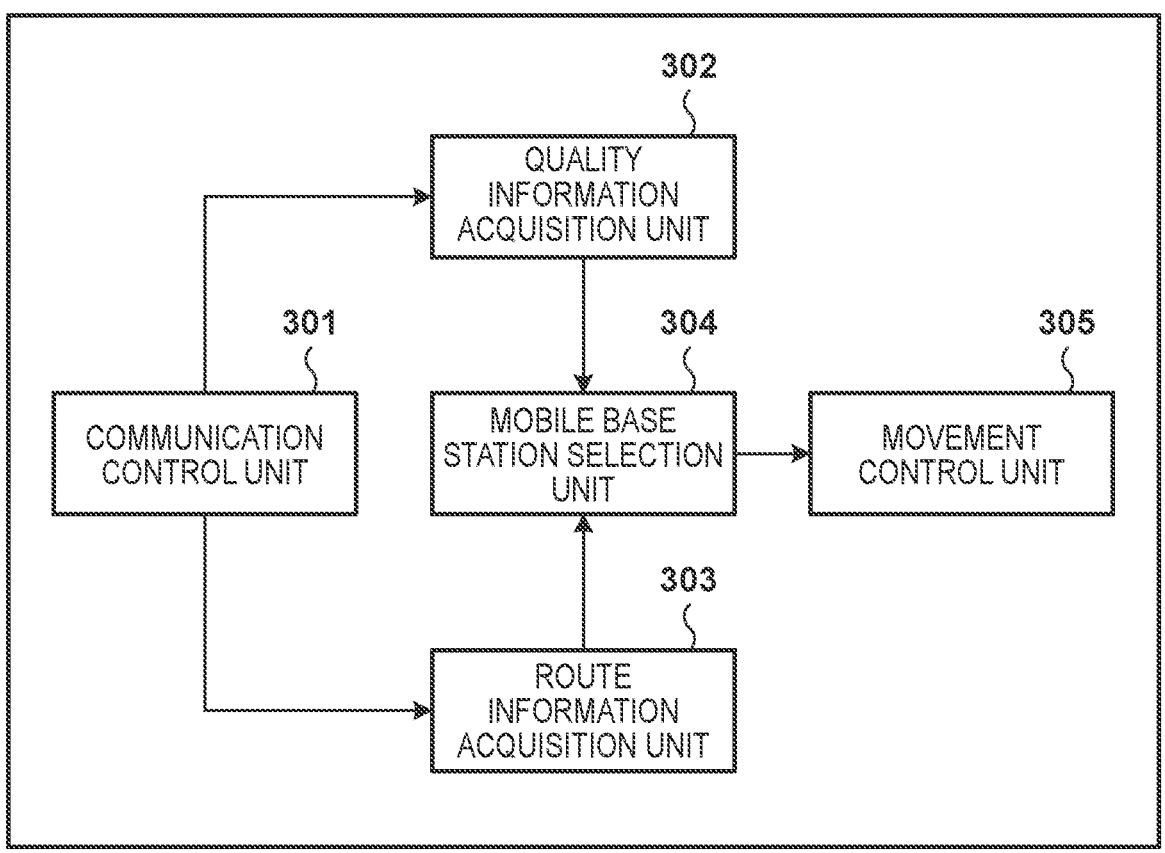
FIG. 3 is a diagram illustrating a functional configuration example of a control device.

FIG. 3 illustrates a functional configuration example of the control device 141 of the present embodiment. In one example, the control device 141 includes a communication control unit 301, a quality information acquisition unit 302, a route information acquisition unit 303, a mobile base station selection unit 304, and a movement control unit 305. The communication control unit 301 controls communication with a device outside the control device 141 or a device including the control device 141. For example, the communication control unit 301 performs control for executing communication with a base station or a network node of the cellular communication system. Furthermore, in a case where the control device 141 is included in a base station or a network node, the control for executing communication with the terminal device can be performed. Furthermore, for example, in a case where remote control of the mobile base station is executed, the communication control unit 301 can execute communication with the mobile base station on the basis of, for example, the cellular communication system.

The quality information acquisition unit 302 acquires information in which a position at which the communication device has performed wireless communication in the cellular communication system at present or in the past is associated with the communication quality. The quality information acquisition unit 302 can acquire the quality information in which the position of the communication device is associated with the communication quality from, for example, a base station capable of directly communicating with the communication device and acquiring a measurement value of the communication quality or a network node that comprehensively manages the communication quality in the cellular communication system. The communication quality is SNR, SINR, RSRP, RSRQ, communication delay, the number of terminal devices in communication (congestion degree), the use rate of radio resources, and the like, and one or more of them can be acquired by the quality information acquisition unit 302. Furthermore, the quality information acquisition unit 302 may acquire the quality information by acquiring a sample value of the communication quality and calculating a value indicating the communication quality to be actually used, such as a statistical value.

The route information acquisition unit 303 acquires information regarding the movement route of the mobile base station. The route information acquisition unit 303 acquires information of the movement route of each mobile base station from, for example, a company that operates and manages the mobile base station or the mobile base station itself. This information may be, for example, information representing a movement route using coordinates or vectors, or may be information for identifying a departure base and an arrival base when inter-base movement is performed. Furthermore, as long as the control device 141 can recognize the movement route of the mobile base station, the route information may be represented in a format other than these.

The mobile base station selection unit 304 specifies an area in which the communication quality is determined to be lower than the predetermined communication quality on the basis of the quality information acquired by the quality information acquisition unit 302. Then, on the basis of the route information acquired by the route information acquisition unit 303, the mobile base station selection unit 304 selects a mobile base station including, in a movement route (or a range of a predetermined distance from the movement route), a position at which the wireless communication service in at least a part of an area specified such that whose communication quality is lower than the predetermined communication quality can be provided. Note that the mobile base station selection unit 304 may select a plurality of mobile base stations for one area. Furthermore, the mobile base station selection unit 304 may select a mobile base station among a plurality of mobile base stations capable of providing the wireless communication service in one area on the basis of the remaining amount of a battery or fuel. For example, the mobile base station selection unit 304 can select a mobile base station having a relatively large remaining amount of a battery or fuel or a mobile base station having a large amount of power or fuel available for providing a wireless communication service in consideration of a battery or fuel consumed by movement to a position at which the wireless communication service is provided. Furthermore, the mobile base station selection unit 304 may select a mobile base station having the shortest movement distance to the position at which the wireless communication service is provided among a plurality of mobile base stations capable of providing the wireless communication service in one area.

The movement control unit 305 executes the control for moving the selected mobile base station to a position at which the wireless communication service is provided in a specified area. This control can be, for example, control for outputting information indicating the selected mobile base station and information indicating a position at which the mobile base station can provide a wireless communication service in a specified area to the outside. That is, the control device 141 is, for example, a device used for an information providing service to a network operator, and can perform the control for presenting information indicating which mobile base station is to be moved to which position to the network operator. Furthermore, this control can be, for example, control for setting a destination with respect to the selected mobile base station in a case where the mobile base station is an automated driving vehicle, a remote driving vehicle, or an automatic flight vehicle that can move automatically. Furthermore, this control may be, for example, control for presenting information indicating which mobile base station is to be moved to which position to the user of the control device 141 via the input/output circuit 205. In this case, the user can manually set the presented position with respect to the selected mobile base station. That is, various types of processing can be executed as long as the control here is control used to move the selected mobile base station to a position at which the wireless communication service in an area specified as having insufficient communication quality can be provided.

(Flow of Processing)

Next, an example of a flow of processing executed by the control device 141 will be described with reference to FIG. 4. Note that, in one example, the present processing is performed when the CPU 201 of the control device 141 executes a program stored in the memory 202. Furthermore, the present processing can be started by the user instructing the start of the processing in the control device 141, but the present processing may be always executed during operation of the control device 141. Note that in the description described below, the details described above will not be repeated.

The control device 141 acquires the quality information in which the position of the communication device is associated with the communication quality at the position and the route information indicating the movement route of the mobile base station (S401, S402), and specifies an area in which the communication quality is lower than the predetermined communication quality based on the quality information (S403). Then, the control device 141 selects a mobile base station that provides the wireless communication service in the specified area further on the basis of the route information (S404). Here, the control device 141 selects the mobile base station on condition that at least a position at which the wireless communication service in at least a part of the specified area can be provided is included in the movement route (or within a range of a predetermined distance from the movement route). Then, the control device 141 executes the control for moving the selected mobile base station to a position at which the wireless communication service can be provided in at least a part of the specified area (S405).

With the above processing, it is possible to improve the communication quality by efficiently using the mobile base station in an area where communication quality is insufficient. As a result, it is possible to reduce the probability that the communication quality of the wireless communication by the terminal device becomes insufficient or the probability that the wireless communication cannot be performed. Therefore, the terminal device can appropriately execute a control operation using wireless communication such as automated driving or remote driving.

Summary of Embodiment

1. A control device according to the present embodiment includes:
   an acquiring unit configured to acquire quality information indicating a correspondence relationship between a position and communication quality related to wireless communication at the position, and route information indicating a movement route of a mobile base station;
   a specifying unit configured to specify an area in which the communication quality is determined to be lower than a predetermined communication quality based on the quality information; and
   a controlling unit configured to execute control for moving the mobile base station to a position at which a wireless communication service can be provided in at least a part of the area in a case where the position is included in the movement route based on the route information.

According to this embodiment, since a mobile base station that moves in the vicinity of an area where communication quality is insufficient as a movement route can be moved for providing a wireless communication service in the area, the communication quality in the area can be efficiently improved. As a result, the terminal device can execute high-quality wireless communication, and control based on wireless communication can also be executed with high quality. Furthermore, since the mobile base station can function as a base station in the vicinity of a preset movement route, it is possible to simplify control of movement to a position to operate as a base station and movement to a base.

2. In the control device according to the embodiment of 1, in a case where a position at which a wireless communication service can be provided in at least a part of the area is not included in the movement route, the controlling unit executes control for moving another mobile base station movable on a movement route including a position at which a wireless communication service can be provided in at least a part of the area so as to provide a wireless communication service in at least a part of the area.

According to this embodiment, it is possible to appropriately select a mobile base station that can efficiently execute provision of a wireless communication service for an area where communication quality is insufficient according to a preset movement route for each of a plurality of mobile base stations.

3. In the control device according to the embodiment of 1 or 2, the specifying unit specifies an area in which the communication quality at present is lower than the predetermined communication quality as the area in which the communication quality is lower than the predetermined communication quality.

According to this embodiment, regarding an area in which it is determined that the communication quality is actually insufficient, the wireless communication service in the area can be efficiently provided using the mobile base station.

4. In the control device according to the embodiment of 1 or 2, the specifying unit specifies an area predicted to be lower than the predetermined communication quality based on the communication quality in a past as the area in which the communication quality is lower than the predetermined communication quality.

According to this embodiment, regarding an area in which the communication quality tends to be insufficient, the wireless communication service in the area can be efficiently provided using the mobile base station.

5. In the control device according to the embodiment of any of 1 to 4, the controlling unit outputs, as the control, a position at which a wireless communication service can be provided in at least a part of the area as a destination of the mobile base station.

According to this embodiment, a position suitable for a mobile base station to provide a wireless communication service can be provided to a company that operates the mobile base station, or can be set in a control device in the mobile base station.

6. In the control device according to the embodiment of any of 1 to 5, the communication quality is based on current or past communication quality of a communication device at a position corresponding to the communication quality.

According to this embodiment, it is possible to execute control based on actual communication results.

7. In the control device according to the embodiment of any of 1 to 6, the mobile base station is an automated driving vehicle or a remote driving vehicle having a base station function.

According to this embodiment, the mobile base station can automatically move to the vicinity of the area where the communication quality is to be improved and autonomously provide the wireless communication service.

8. In the control device according to the embodiment of any of 1 to 6, the mobile base station is an automatic flight vehicle having a base station function.

According to this embodiment, the mobile base station can automatically move to the vicinity of the area where the communication quality is to be improved and autonomously provide the wireless communication service.

9. A control method according to the embodiment is a control method executed by a control device, the method includes:

acquiring quality information indicating a correspondence relationship between a position and communication quality related to wireless communication at the position, and route information indicating a movement route of a mobile base station;

specifying an area in which the communication quality is determined to be lower than a predetermined communication quality based on the quality information; and executing control for moving the mobile base station to a position at which a wireless communication service can be provided in at least a part of the area in a case where the position is included in the movement route based on the route information.

According to this embodiment, since a mobile base station that moves in the vicinity of an area where communication quality is insufficient as a movement route can be moved for providing a wireless communication service in the area, the communication quality in the area can be efficiently improved. Furthermore, since the mobile base station can function as a base station in the vicinity of a preset movement route, it is possible to simplify control of movement to a position to operate as a base station and movement to a base.

10. A program according to the embodiment causes a computer included in a control device to:

acquire quality information indicating a correspondence relationship between a position and communication quality related to wireless communication at the position, and route information indicating a movement route of a mobile base station;

specify an area in which the communication quality is determined to be lower than a predetermined communication quality based on the quality information; and execute control for moving the mobile base station to a position at which a wireless communication service can be provided in at least a part of the area in a case where the position is included in the movement route based on the route information.

According to this embodiment, since a mobile base station that moves in the vicinity of an area where communication quality is insufficient as a movement route can be moved for providing a wireless communication service in the area, the communication quality in the area can be efficiently improved. Furthermore, since the mobile base station can function as a base station in the vicinity of a preset movement route, it is possible to simplify control of movement to a position to operate as a base station and movement to a base.

According to the present invention, it is possible to improve communication quality in an area where communication quality is insufficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device comprising:
one or more processors; and
one or more memories that store instructions that, when executed by the one or more processors, cause the one or more processors to at least:
acquire quality information indicating a correspondence relationship between a position and communication quality related to wireless communication at the position, and route information indicating a movement route of a mobile base station, wherein the movement route is predefined, the mobile base station is capable of moving along the movement route, and movement of the mobile base station is restricted to the movement route;
specify an area in which the communication quality is determined to be lower than a predetermined communication quality based on the quality information; and
control for moving the mobile base station to a position at which a wireless communication service can be provided in at least a part of the area in a case where the position is included in the movement route based on the route information.

2. The control device according to claim 1, wherein in a case where a position at which a wireless communication service can be provided in at least a part of the area is not included in the movement route, control is executed for moving another mobile base station movable on a movement route including a position at which a wireless communication service can be provided in at least a part of the area so as to provide a wireless communication service in at least a part of the area.

3. The control device according to claim 1, wherein the specifying further comprises specifying an area in which the communication quality at present is lower than the predetermined communication quality as the area in which the communication quality is lower than the predetermined communication quality.

4. The control device according to claim 1, wherein the specifying further comprises specifying an area predicted to be lower than the predetermined communication quality based on the communication quality in a past as the area in which the communication quality is lower than the predetermined communication quality.

5. The control device according to claim 1, wherein the instructions, when executed by the one or more processors, further cause the one or more processors to at least output, as the control, a position at which a wireless communication service can be provided in at least a part of the area as a destination of the mobile base station.

6. The control device according to claim 1, wherein the communication quality is based on current or past communication quality of a communication device at a position corresponding to the communication quality.

7. The control device according to claim 1, wherein the mobile base station is an automated driving vehicle or a remote driving vehicle having a base station function.

8. The control device according to claim 1, wherein the mobile base station is an automatic flight vehicle having a base station function.

9. A control method executed by a control device, the method comprising:
acquiring quality information indicating a correspondence relationship between a position and communication quality related to wireless communication at the position, and route information indicating a movement route of a mobile base station, wherein the movement route is predefined, the mobile base station is capable of moving along the movement route, and movement of the mobile base station is restricted to the movement route;

specifying an area in which the communication quality is determined to be lower than a predetermined communication quality based on the quality information; and executing control for moving the mobile base station to a position at which a wireless communication service can be provided in at least a part of the area in a case where the position is included in the movement route based on the route information.

10. A non-transitory computer-readable storage medium that stores a program for causing a computer included in a control device to:

acquire quality information indicating a correspondence relationship between a position and communication quality related to wireless communication at the position, and route information indicating a movement route of a mobile base station, wherein the movement route is predefined, the mobile base station is capable of moving along the movement route, and movement of the mobile base station is restricted to the movement route;

specify an area in which the communication quality is determined to be lower than a predetermined communication quality based on the quality information; and execute control for moving the mobile base station to a position at which a wireless communication service can be provided in at least a part of the area in a case where the position is included in the movement route based on the route information.

* * * * *